United States Patent [19]

Nishio et al.

[11] Patent Number: 5,574,453
[45] Date of Patent: Nov. 12, 1996

[54] DIGITAL AUDIO RECORDING APPARATUS

[75] Inventors: Ayataka Nishio, Kanagawa; Yasuhiro Ogura, Tokyo, both of Japan

[73] Assignee: Sony Corporation, Tokyo, Japan

[21] Appl. No.: 395,242

[22] Filed: Feb. 24, 1995

[30] Foreign Application Priority Data

Mar. 3, 1994 [JP] Japan ................................ 6-033822

[51] Int. Cl.$^6$ .............................. H04N 1/38; H03M 7/00
[52] U.S. Cl. ........................ 341/143; 341/144; 358/400
[58] Field of Search ................................. 341/143, 144, 341/77; 358/261

[56] References Cited

U.S. PATENT DOCUMENTS

| | | | |
|---|---|---|---|
| 4,053,712 | 11/1977 | Reindl | 179/15.55 |
| 4,590,531 | 5/1986 | Platte et al. | |
| 5,200,750 | 4/1993 | Fushiki | 341/143 |
| 5,208,594 | 5/1993 | Yamazaki | |
| 5,351,048 | 9/1994 | Yamasaki | 341/110 |

FOREIGN PATENT DOCUMENTS

| | | |
|---|---|---|
| 2520141 | 7/1983 | France . |
| 3201299 | 10/1990 | Japan . |

*Primary Examiner*—Jeffrey A. Gaffin
*Assistant Examiner*—Peguy JeanPierre
*Attorney, Agent, or Firm*—Jay H. Maioli

[57] ABSTRACT

An audio signal recording device has an input terminal, a modulator for modulating an input signal, a detecting circuit for detecting whether an input signal maintains a fixed value for a predetermined period of time, a signal generator for generating an idling signal, a delay for delaying a modulated input signal and a switch for alternately inputting either the idling signal or modulated input signal to a recording circuit.

3 Claims, 13 Drawing Sheets

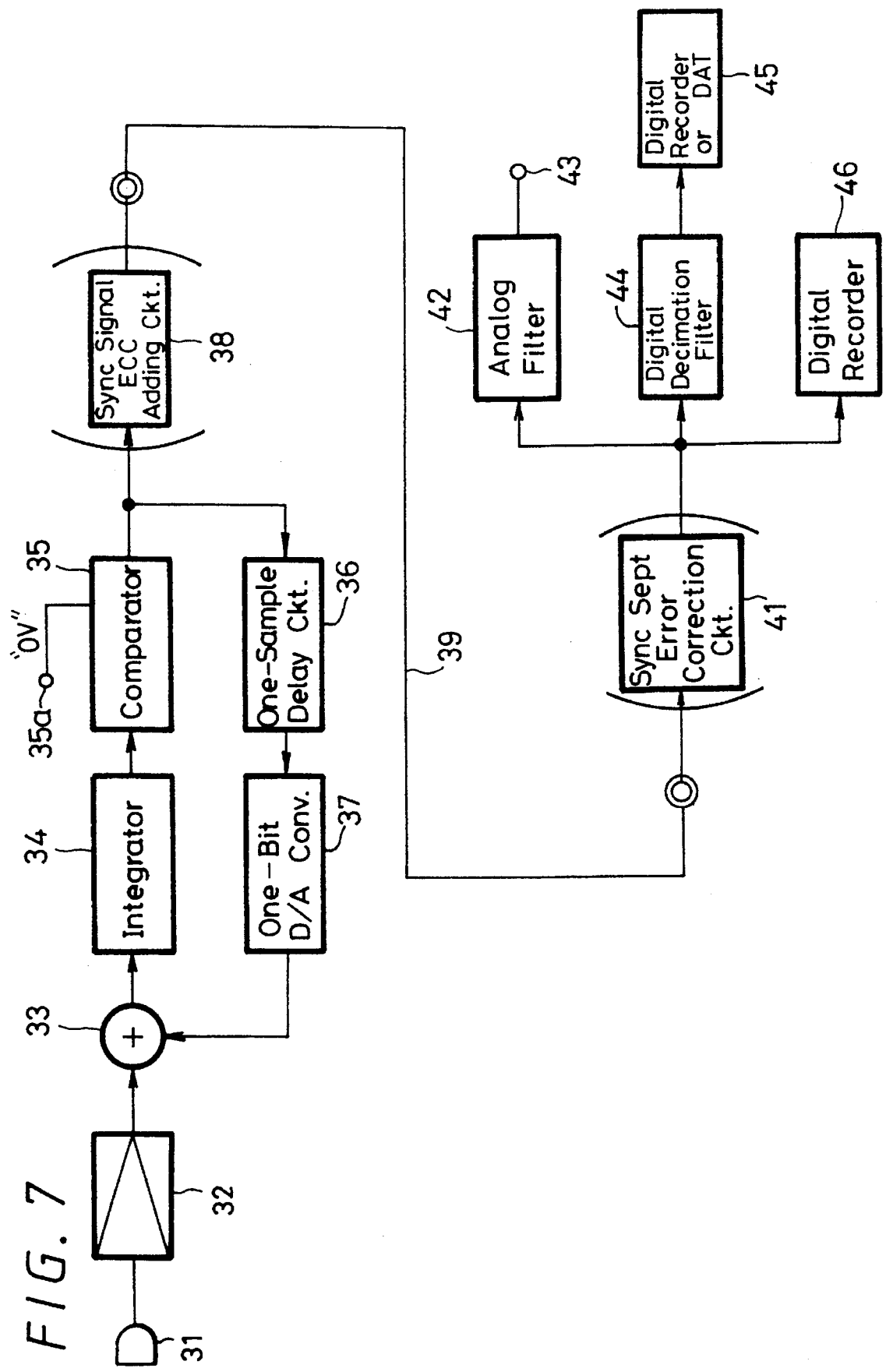

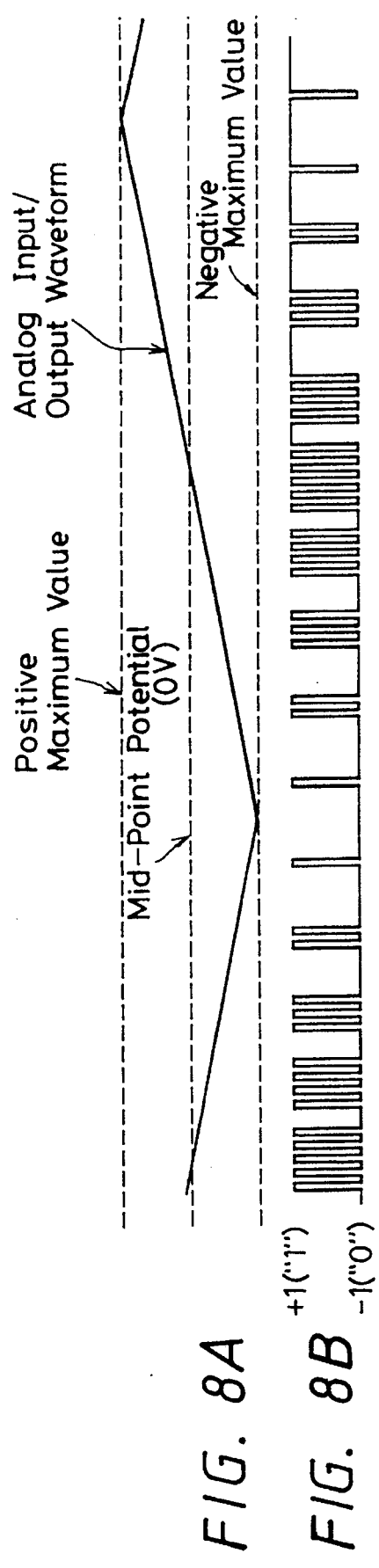

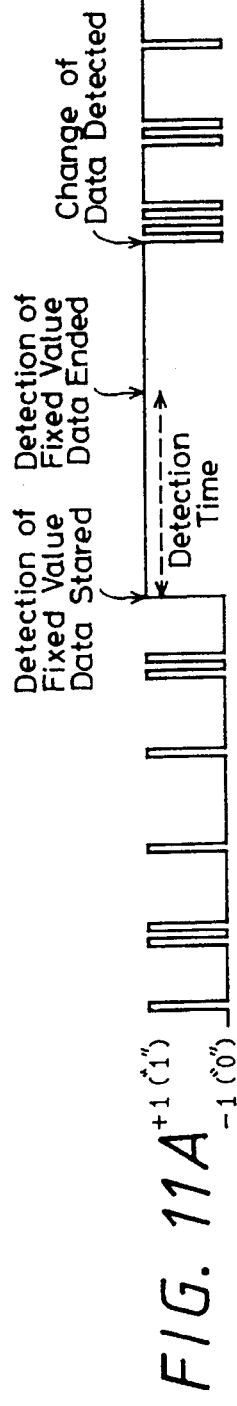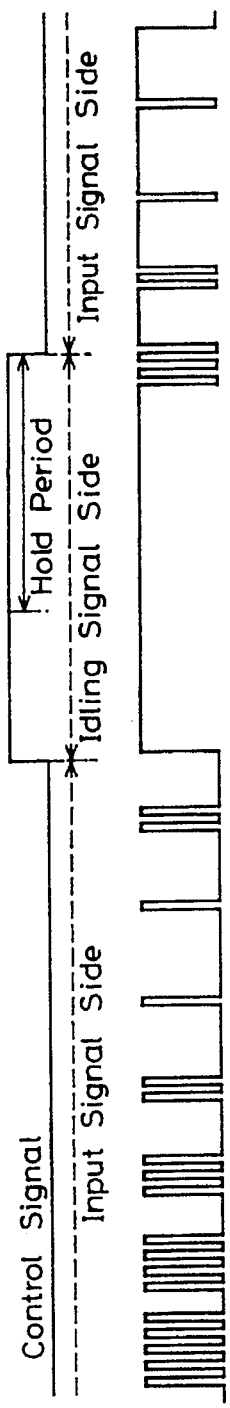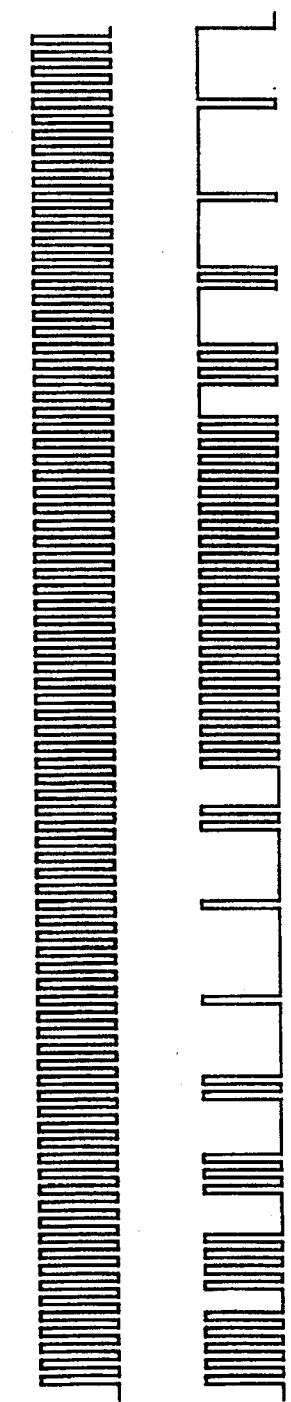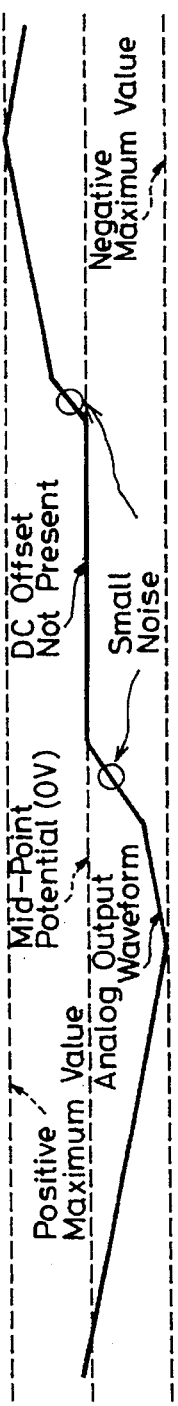

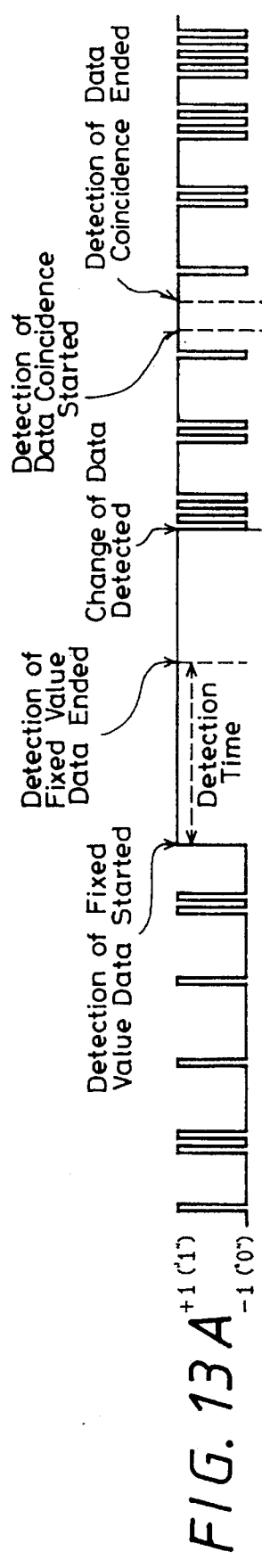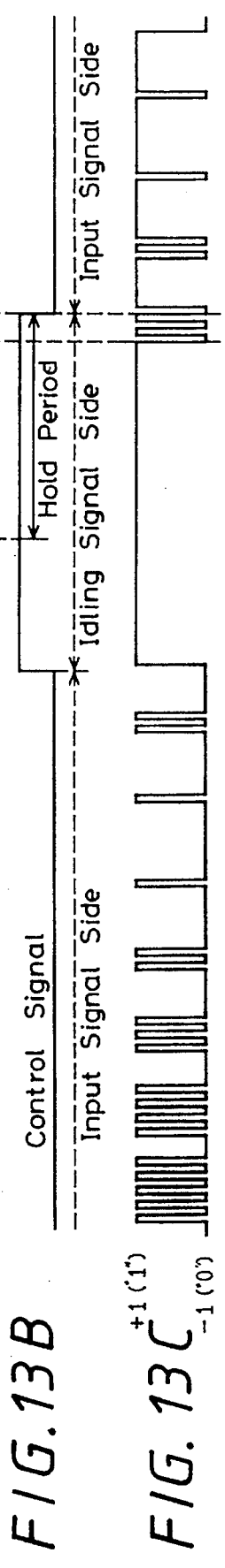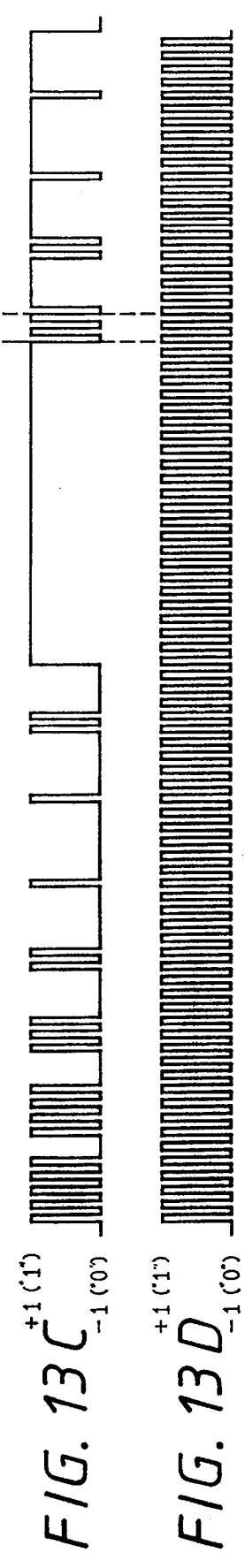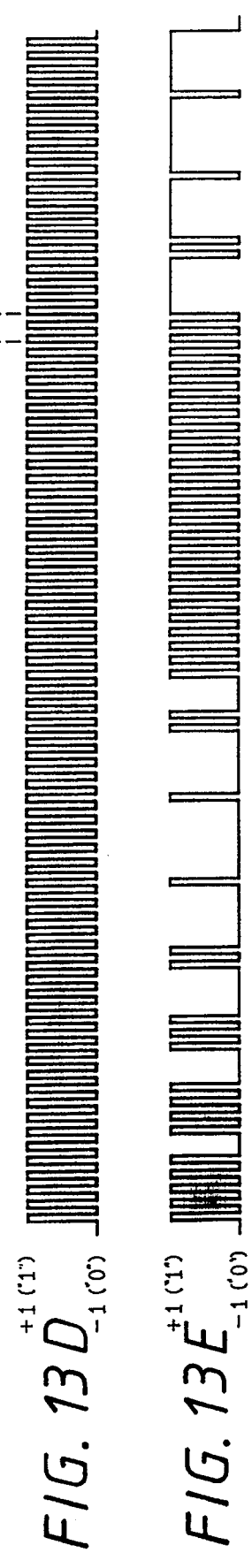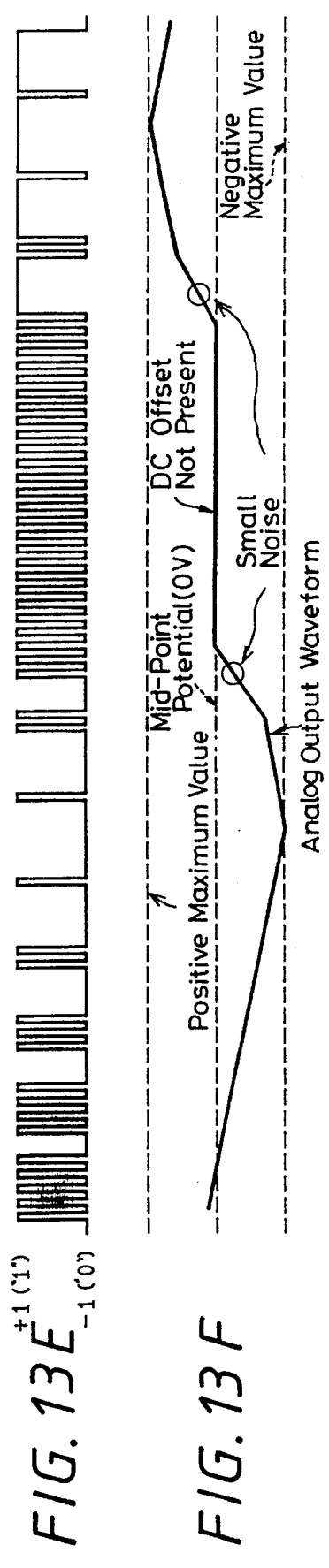

DIGITAL AUDIO RECORDING APPARATUS

FIELD OF THE INVENTION

The present invention relates to a digital audio recorder. More particularly, the present invention relates to a digital audio recorder capable of preventing damaging output signals caused by an error in a sigma-delta modulated input signal.

BACKGROUND OF THE INVENTION

As methods of digitizing and transmitting (recording and reproducing) an audio signal, there have hitherto been proposed recording and reproducing apparatus, such as a CD (compact disc) player and a DAT (digital audio type recorder) and digital audio broadcasting such as broadcast satellite or the like. The digital audio transmitting apparatus uses a format in which a sampling frequency is 48 kHz or 44.1 kHz and a quantization bit number is 16 bits or the like in order to digitize an audio signal.

In the digital audio transmitting apparatus, the quantization bit number of the digital audio signal generally limits a dynamic range of a demodulated audio signal. Therefore, when data of high audio quality is transmitted, the quantization bit number has to be expanded from the existing bit number, i.e., 16 bits to another bit number, such as 20 bits or 24 bits. Once the format is determined, it is not so easy to expand the quantization bit number. Thus, the digital audio transmitting apparatus cannot generate an audio signal of high audio quality.

As a method of digitizing an audio signal, there is proposed a method which is often referred to as sigma-delta modulation. Such a method is disclosed in U.S. Pat. No. 5,351,048 (issue date: Sep. 27, 1994) to Yoshio Yamasaki. The disclosure of U.S. Pat. No. 5,351,048 is hereby incorporated by reference.

FIG. 1 of the accompanying drawings shows in block form an arrangement of an example of 1-bit sigma-delta modulation. As shown in FIG. 1, an input audio signal applied to an input terminal 91 is supplied through an adder 92 to an integrator 93. An integrated output signal from the integrator 93 is supplied to a comparator 94, in which it is compared with a mid-range potential of the input audio signal and quantized in one bit at every sample period. As a frequency (sampling frequency) of the sample period, there is used a frequency which is 64 times or 128 times as high as 44.1 kHz or 48 kHz (2.816 MHz. & 5.632 MHz or 3.072 MHz & 6.144 MHz).

The quantized signal is supplied to a delay circuit 95 and thereby delayed by one sample period. The delayed signal is processed through a one-bit digital-to-analog (D/A) converter 96 to an adder 92, in which it is added with the input audio signal supplied thereto from the input terminal 91. The quantized signal output from the comparator 94 is developed at an output terminal 97. Therefore, according to the sigma-delta modulation, as described in the above-mentioned literature, it is possible to obtain a digital audio signal of wide dynamic range by sufficiently increasing the frequency (sampling frequency) of the sample period.

In the sigma-delta modulation, when the modulated (quantized) signal is transmitted (recorded and reproduced), "+1" of the quantized signal is converted to "1" and "−1" of the quantized signal is converted to "0". In that case, if an abnormality occurs in the transmission system and the signal is lost, then the signal is fixed to "1" or "0". In the sigma-delta modulation, consecutive "1" and "0" correspond to a positive maximum value and a negative maximum value of a demodulated signal, respectively. Accordingly, if a signal line is broken in the transmission system, then a noise of maximum level occurs at that very moment. As a result, the risk of damage to a monitor amplifier or loudspeaker due to excessive input signal is quite great.

In a CD player or DAT, for example, the signal format is determined so that the consecutive "1" and "0" become intermediate values of the demodulated signal, respectively. Thus, the occurrence of the noise of maximum level can be avoided. It is therefore proposed that data, which results from the sigma-delta modulation, is converted to data conforming to the signal format of the CD player and the DAT by using a decimation filter. In this case, however, it becomes difficult to extract data of high audio quality from the transmitted signal by increasing the quantization bit number.

SUMMARY OF THE INVENTION

In view of the aforesaid aspect, it is an object of the present invention to provide a digital audio transmission apparatus in which a quantization bit number can be increased with ease by effecting a transmission using so-called sigma-delta modulation.

It is another object of the present invention to provide a digital audio transmission apparatus in which a noise of maximum level can be prevented from being generated when an abnormality occurs in the transmission system by switching a quantized signal to a predetermined idling signal.

According to an aspect of the present invention, there is provided an audio signal supplying apparatus which is comprised of a sigma-delta modulating circuit for outputting a sigma-delta modulated audio signal by sigma-delta modulating an input audio signal, a detecting circuit for detecting that the sigma-delta modulated audio signal takes a fixed value during a time period longer than a predetermined time, an idling signal generating circuit for generating an idling signal corresponding to a mid-point potential of the input audio signal, a delay circuit for delaying the sigma-delta modulated audio signal by a predetermined time, and a switching circuit for switching and outputting a delayed signal from the delay circuit and the idling signal based on a detected result of the detecting circuit.

According to another aspect of the present invention, there is provided an audio signal transmission apparatus which is comprised of a microphone, a sigma-delta modulating circuit for sigma-delta modulating an audio signal supplied thereto from the microphone, a circuit for transmitting a sigma-delta audio signal supplied thereto from the sigma-delta modulating circuit, and a filter for receiving and filtering out the sigma-delta modulated audio signal transmitted thereto.

BRIEF DESCRIPTION OF THE DRAWINGS

FIG. 7 is a schematic block diagram showing a digital audio transmission apparatus according to a third embodiment of the present invention;

FIG. 8A is a schematic diagram used to explain a sigma-delta modulated signal;

FIG. 8B is a schematic diagram used to explain a sigma-delta modulated signal;

FIG. 8C is a schematic diagram used to explain a sigma-delta modulated signal;

FIG. 8D is a schematic diagram used to explain a sigma-delta modulated signal;

FIG. 11A is a schematic diagram used to explain operation of the digital audio transmission apparatus shown in FIG. 10;

FIG. 11B is a schematic diagram used to explain operation of the digital audio transmission apparatus shown in FIG. 10;

FIG. 11C is a schematic diagram used to explain operation of the digital audio transmission apparatus shown in FIG. 10;

FIG. 11D is a schematic diagram used to explain operation of the digital audio transmission apparatus shown in FIG. 10;

FIG. 11E is a schematic diagram used to explain operation of the digital audio transmission apparatus shown in FIG. 10;

FIG. 11F is a schematic diagram used to explain operation of the digital audio transmission apparatus shown in FIG. 10;

FIG. 13A is a diagram used to explain operation of the digital audio transmission apparatus shown in FIG. 12;

FIG. 13B is a diagram used to explain operation of the digital audio transmission apparatus shown in FIG. 12;

FIG. 13C is a diagram used to explain operation of the digital audio transmission apparatus shown in FIG. 12;

FIG. 13D is a diagram used to explain operation of the digital audio transmission apparatus shown in FIG. 12;

FIG. 13E is a diagram used to explain operation of the digital audio transmission apparatus shown in FIG. 12;

FIG. 13F is a diagram used to explain operation of the digital audio transmission apparatus shown in FIG. 12;

DETAILED DESCRIPTION OF THE INVENTION

Figure 1:
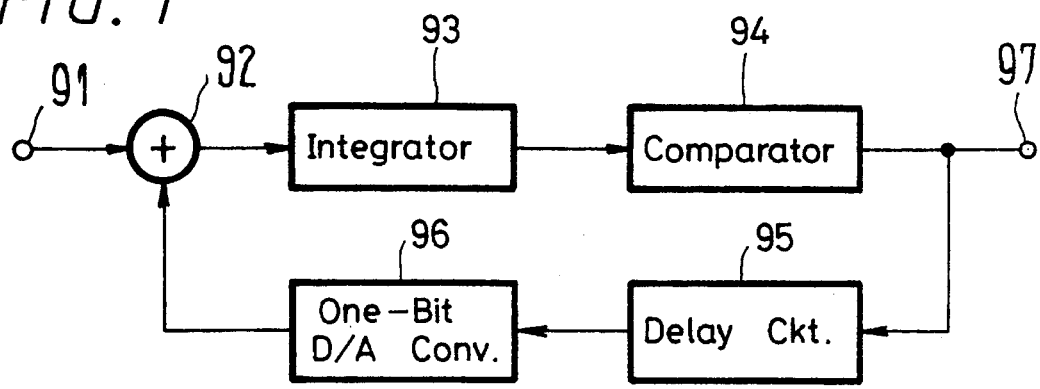
FIG. 1 is a block diagram showing an example of a sigma-delta modulation.
Figure 2:
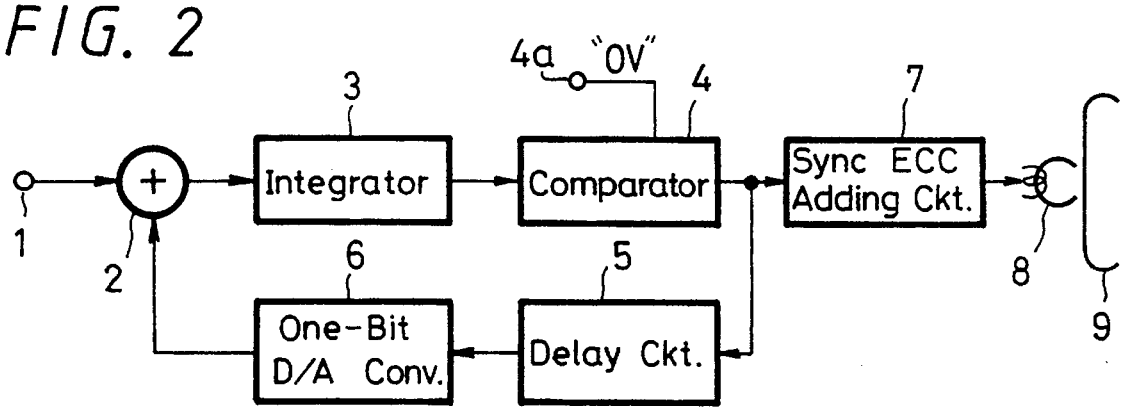
FIG. 2 is a block diagram showing a recording system of a digital audio transmission apparatus according to an embodiment of the present invention.

The present invention will now be described with reference to the drawings. As shown in FIG. 2, an input audio signal from an input terminal 1 is supplied through an adder 2 to an integrator 3. A signal from the integrator 3 is supplied to a comparator 4, in which it is compared with a mid-point potential of the input audio signal and quantized in one bit at every sampling period. A frequency (sampling frequency) in the sampling period is 64 times or 128 times as high as the sampling frequencies 48 kHz and 44.1 kHz.

The quantized signal is delayed by one sample period by a delay circuit 5. The delayed signal from the delay circuit 5 is supplied through a one-bit D/A converter 6 to an adder 2, in which it is added to/with the input audio signal supplied thereto from the input terminal 1. Thus, the comparator 4 outputs a quantized signal which results from sigma-delta modulating the input audio signal. The quantized signal output from the comparator 4 is supplied to a synchronizing (sync) signal and error correction code (ECC) adding circuit 7, in which the quantized signal of every predetermined number of samples is added with a sync signal and an error correction code. The quantized signal with the sync signal and the error correction code is supplied to a recording head 8 and thereby recorded on a recording medium (magnetic tape) 9.

Figures 3A, 3B:
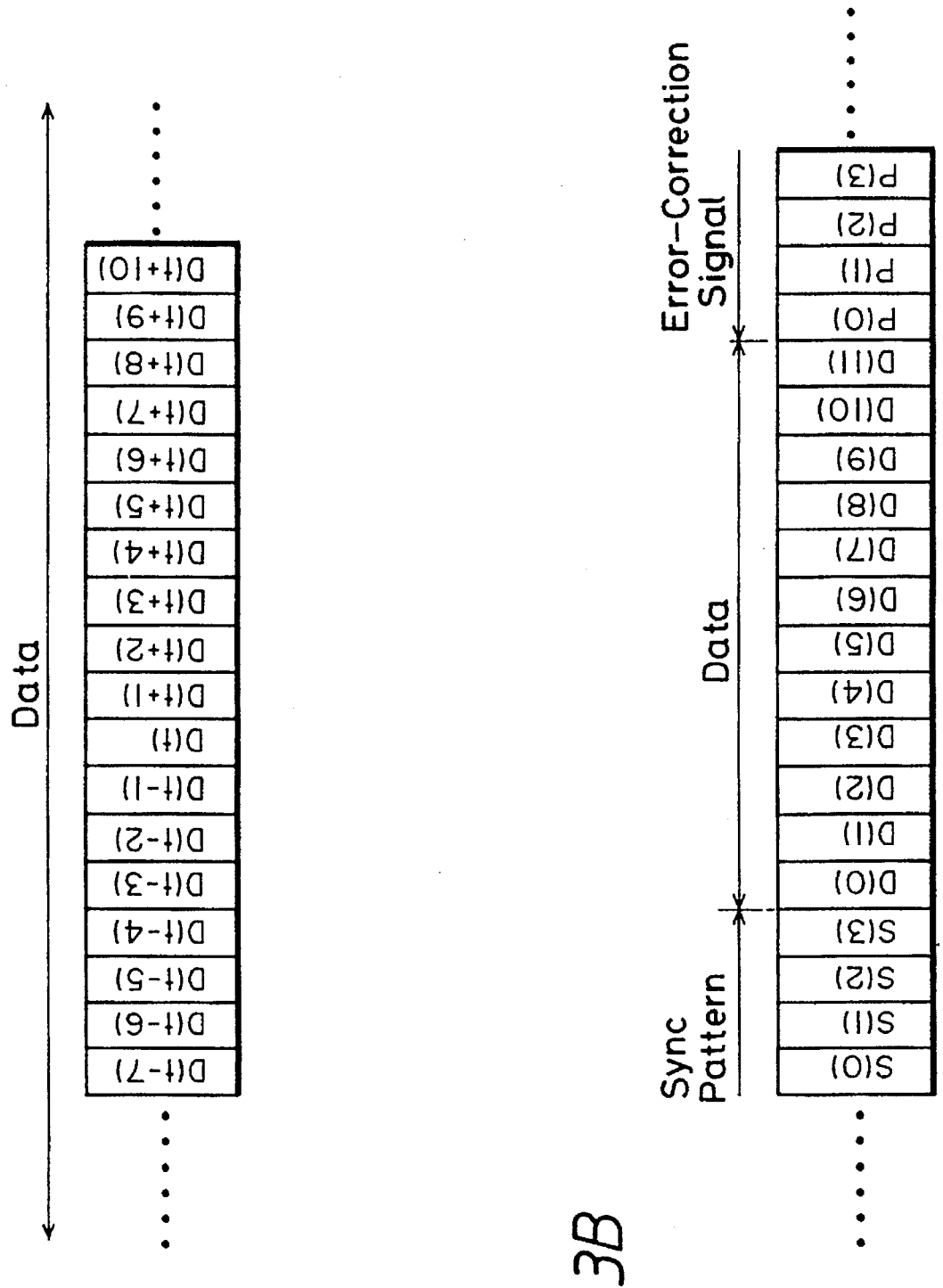
FIG. 3A is a schematic diagram showing a format of a signal recorded on a recording medium.
FIG. 3B is a schematic diagram showing a format of a signal recorded on a recording medium.

FIGS. 3A and 3B show a format of a signal recorded on the recording medium (magnetic tape) 9. The quantized signal may be recorded on the recording medium 9 in the form of original data D(t–7), D(t–6) . . . , D(t–1), D(t), D(t+1) . . . , D(t+9), D(t+10) as shown in FIG. 3A. Alternatively, as shown in FIG. 3B, the quantized signal may be divided at every 12 data samples D(0) to D(11) and sync signals S(0) to S(3) and error correction codes P(0) to P(3) may be added to every 12 data samples D(0) to D(11), thereby making it possible to detect and correct a transmission error that occurred during transmission (recording and reproducing). Furthermore, in the recording and reproducing apparatus, data may be interleaved in order to satisfactorily avoid a burst error occurring in the recording medium.

Figure 4:
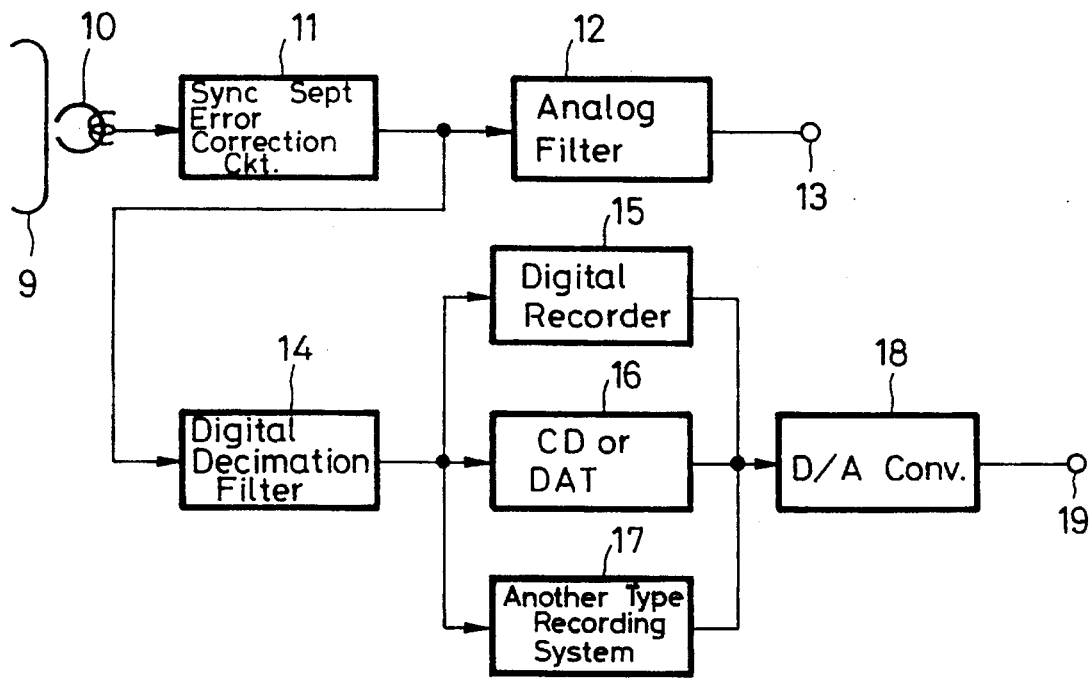
FIG. 4 is a block diagram showing a reproducing system of the digital audio transmission apparatus according to the embodiment of the present invention.

As shown in FIG. 4, the signal recorded on the recording medium (magnetic tape) 9 is reproduced by a reproducing head 10. The reproduced signal is supplied to a sync separation and error correction circuit 11 which derives a quantized signal which results from sigma-delta modulating the input audio signal. The sigma-delta modulated quantized signal is converted by an analog filter 12 to an analog signal. The analog audio signal is developed at an output terminal 13.

The sigma-delta modulated quantized signal from the sync separation and error correction circuit 11 is converted by a digital decimation filter 14 to a signal of arbitrary format, such as CD format and DAT format or the like. The signal converted to the arbitrary signal format is supplied through a reproducing system 15 of a digital recorder, a reproducing system 16 of a CD and DAT or a reproducing system 17 of a minidisc or DCC to a digital-to-analog (D/A) converter 18, in which it is converted to an analog audio signal. The resulting analog audio signal is developed at an output terminal 19.

Figure 5A:
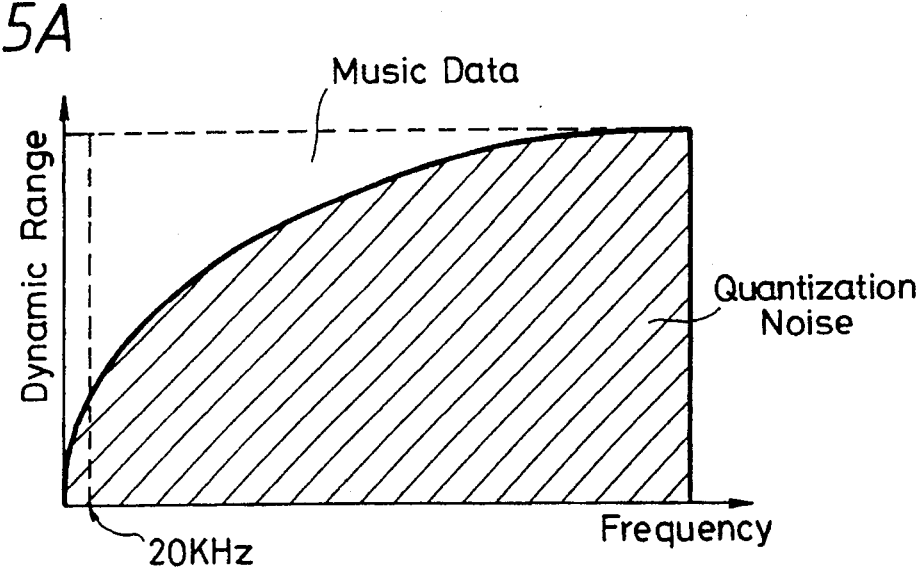
FIG. 5A is a diagram used to explain operation of the digital audio transmission apparatus shown in FIG. 4.
Figure 5B:
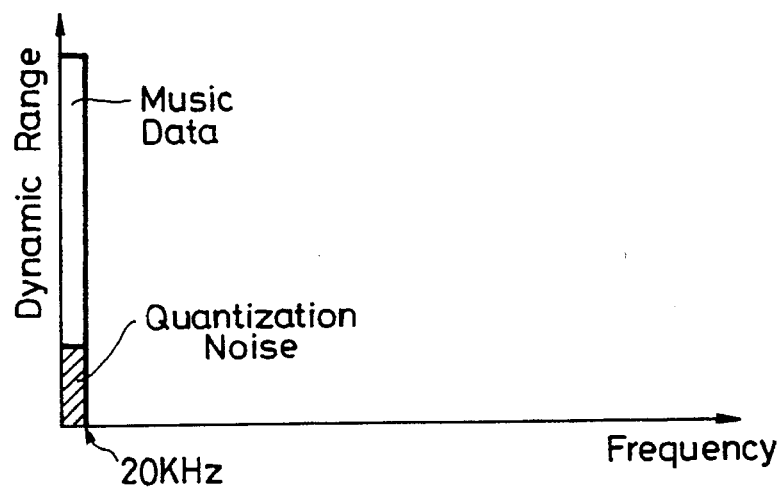
FIG. 5B is a diagram used to explain operation of the digital audio transmission apparatus shown in FIG. 4

In this way, the input audio signal is sigma-delta modulated and recorded on the recording medium and that signal recorded on the recording medium is reproduced with the arbitrary signal format. The sigma-delta modulated signal has a frequency spectrum shown in FIG. 5A. A quantization noise shown hatched is reduced in a frequency of less than 20 kHz in an audio range as compared with a signal format, such as CD format and DAT format shown in FIG. 5B and therefore a wide dynamic range can be obtained.

Figure 5C:
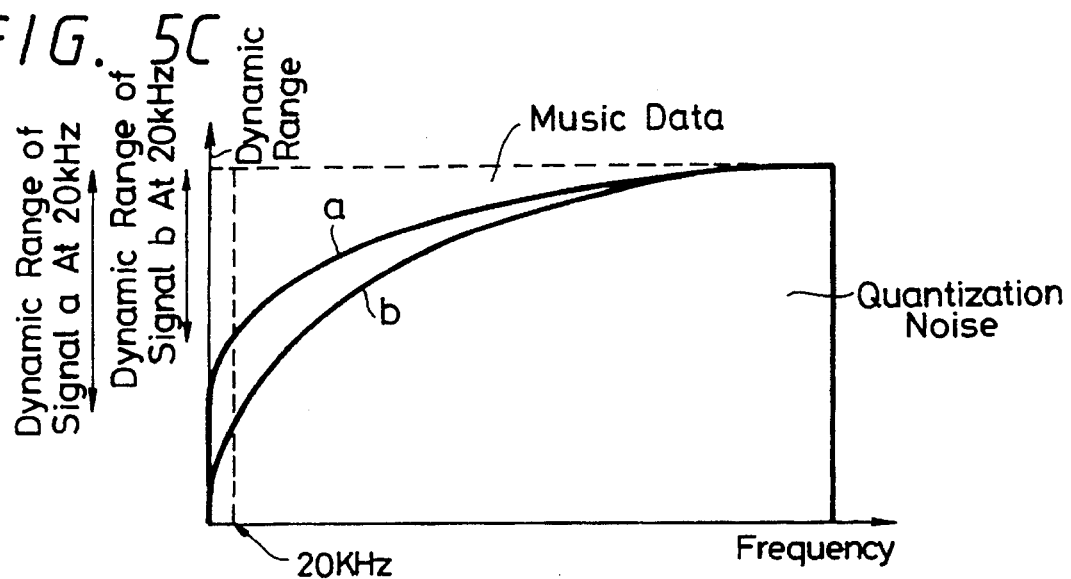
FIG. 5C is a diagram used to explain operation of the digital audio transmission apparatus shown in FIG. 4

In FIG. 5C, when a curve a represents a spectrum of a sigma-delta modulated signal from the existing sigma-delta modulation circuit, there is then the possibility that a sigma-delta modulation circuit which outputs a sigma-delta modulated signal whose frequency spectrum is shown by a curve b is developed. In that case, it is possible to enhance performance of the above-mentioned recording and reproducing apparatus by changing only the sigma-delta modulation circuit while the recording format and the rest of the arrangement are not changed.

Further, since the sampling frequency can be set to an extremely high frequency, such as frequencies 64 times or 128 times as high as the sampling frequencies of 48 kHz and 44.1 kHz, it is possible to considerably expand a frequency band of a recorded audio signal from the frequency band of 20 kHz.

Figure 6:
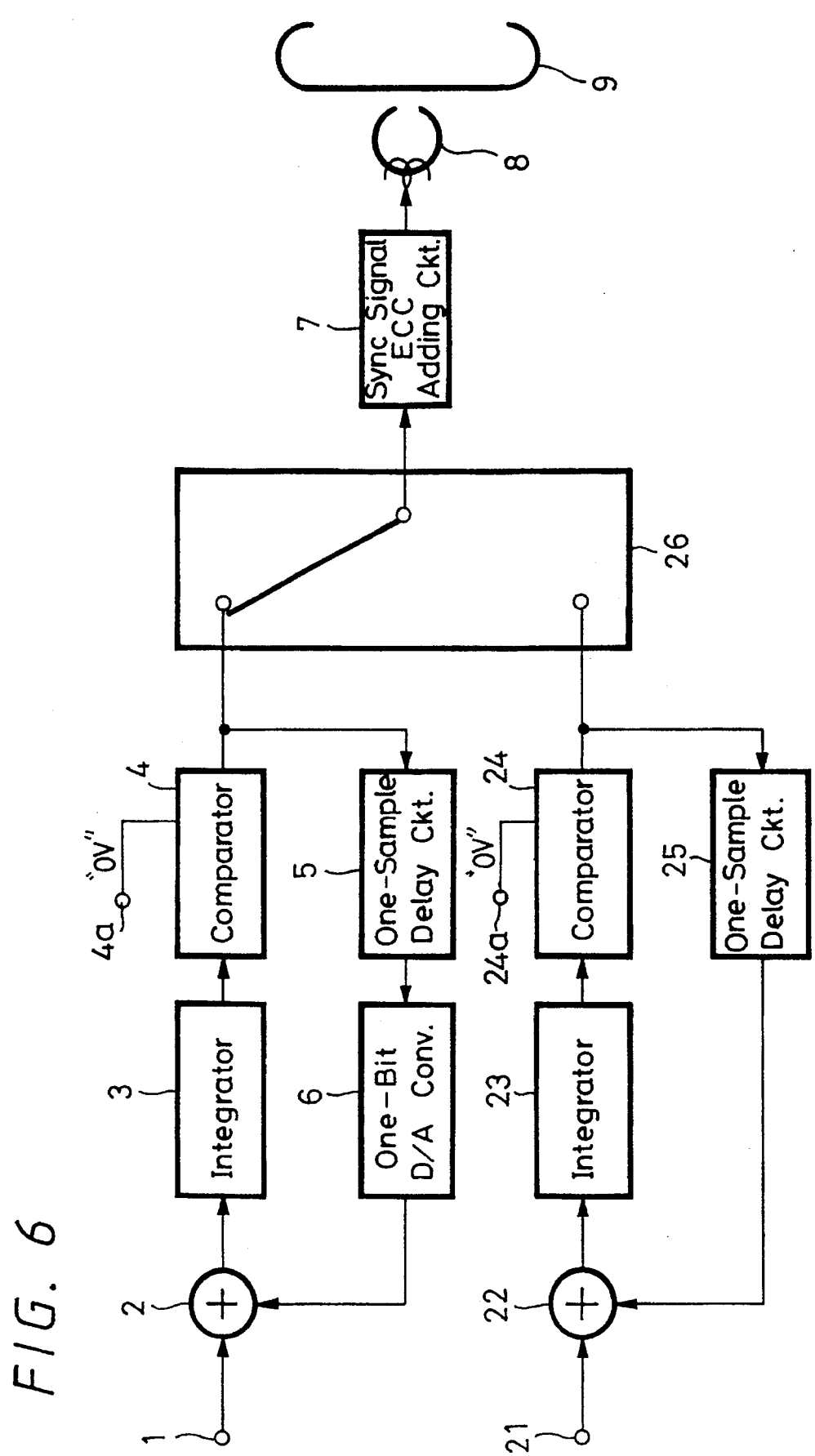
FIG. 6 is a schematic block diagram showing a digital audio transmission apparatus according to a second embodiment of the present invention.

As described above, according to the recording and reproducing apparatus, it is possible to increase the quantization bit number with ease by transmitting the audio signal with the sigma-delta modulation. In the recording and reproducing apparatus, when an input audio signal is supplied in the form of a digital signal, the signal delayed by one sampling period by the delay circuit 5 need not be converted by the one-bit D/A converter 6. FIG. 6 shows in block form a digital audio transmission apparatus according to a second embodiment of the present invention. In FIG. 6, like parts corresponding to those of FIG. 2 are marked with the same reference numbers/letters and therefore need not be described in detail. As shown in FIG. 6, the analog audio signal applied to the analog input terminal 1 is supplied to and processed by the aforesaid circuits. Particularly, in FIG. 6, there is provided a digital input terminal 21. FIG. 6 shows an arrangement of a recording system using one-bit sigma-delta modulation, for example.

As shown in FIG. 6, a digital audio signal applied to the digital input terminal 21 is supplied to an adder 22, an integrator 23, a comparator 24 and a delay circuit 25 which are the same in operation and digital circuit arrangement as those of the adder 2, the integrator 3, the comparator 4 and the delay circuit 5 as shown in FIG. 2. A D/A converter which corresponds to the D/A converter 6 need not be provided. An output signal from the comparator 24 or the output signal from the comparator 4 are selected by a selector switch 26 and supplied to the sync signal and error correction code adding circuit 7.

It is possible to arrange a digital audio recording and reproducing apparatus which can record and reproduce both an analog audio signal and a digital audio signal. Alternatively, it is possible to arrange a recording and reproducing apparatus which can record and reproduce only a digital audio signal. FIG. 7 shows in block form an arrangement of the digital audio transmission apparatus according to the present invention which is applied to a microphone apparatus. The microphone apparatus shown in FIG. 7 uses a one-bit sigma-delta modulation. It will be appreciated by those skilled in the art, that the present invention is not limited to input sources of microphones only. Input sources may include, for example, musical instruments, MIDI devices, tape recorders, CD players, etc.

As shown in FIG. 7, an audio signal from a microphone device 31 is supplied through an amplifier 32 to an adder 33. An output signal from the adder 33 is supplied to an integrator 34. An integrated signal output from the integrator 34 is supplied to a comparator 35, in which it is compared with a mid-point potential of an input audio signal and quantized in one bit at every sampling period. A frequency (sampling frequency) of the sampling period is a sampling frequency 64 times or 128 times as high as the sampling frequency of 48 kHz and 44.1 kHz.

The quantized signal from the comparator 35 is supplied to and delay by a delayed time of one sampling period by a delay circuit 36. The delayed signal from the delay circuit 36 is supplied to and converted by a one-bit D/A converter 37 to an analog audio signal. The analog audio signal from the D/A converter 37 is supplied to the adder 33, in which it is added with the audio signal amplified by the amplifier 32. Thus, the comparator 35 outputs the quantized signal which results from sigma-delta modulating the audio signal supplied from the microphone device 31. The quantized signal output from the comparator 35 is supplied to a sync signal and error correction code adding circuit 38, in which the quantized signal is added with a sync signal and an error correction code after a predetermined number of samples.

The quantized signal added with the sync signal and the error correction code is transmitted through a transmission line 39. The signal thus transmitted is supplied to a sync separation and error correction circuit 41 which derives a quantized signal in which the audio signal from the microphone device 31 is sigma-delta modulated. The sigma-delta modulated quantized signal from the sync separation and error correction circuit 41 is converted by an analog filter 42 to an analog audio signal. The resulting analog audio signal is developed at an output terminal 43.

Alternatively, the sigma-delta modulated quantized signal output from the sync separation and error correction circuit 41 is converted by a digital decimation filter 44 to a signal with a suitable signal format, such as the signal format of conventional CD and DAT. The signal with the above arbitrary signal format is recorded by a digital recorder 45 of arbitrary format, such as DAT format or the like. The sigma-delta modulated quantized signal output from the sync separation and error correction circuit 41 may be recorded by a digital recorder 46 as it is.

Accordingly, since the microphone apparatus uses the sigma-delta modulation, it is possible to satisfactorily transmit a digital audio signal without deteriorating a tone quality when using a relatively long transmission line 39. The microphone apparatus needs only a sigma-delta modulation circuit and a complex A/D converter or the like need not be provided. Therefore, it is possible to realize a simple, miniaturized and light weight microphone apparatus.

With regard to the microphone apparatus/input source, when there is no risk that an input signal will be deteriorated because the length of the transmission line 39 is of a limited length, it is possible to remove the sync signal and error correction code adding circuit 38 and the sync separation and error correction circuit 41. The transmission line 39 is not limited to a wire transmission line and a digital audio signal can be transmitted via radio or infrared waves, or the like, by use of an appropriate transmitter and receiver.

In the above-mentioned digital audio transmission apparatus, the digital audio recording and reproducing apparatus for recording and reproducing the sigma-delta modulated digital audio signal and the peripheral devices can realize sufficiently high flexibility which can cope with various future digital audio media having wide dynamic range and wide frequency band that can be transmitted (recorded and reproduced).

In order to realize the digital audio recording and reproducing apparatus for recording and reproducing the sigma-delta modulated digital audio signal and the peripheral devices, a mute function is desirable to prevent recording and reproducing noise generated when the supply of a digital audio signal is interrupted due to equipment trouble/failure, and thereby prevent damage to the recording medium and/or equipment connected to the later stage of the digital audio recording and reproducing apparatus. However, there has not hitherto been proposed a method of realizing a mute function by a digital signal processing system which processes the sigma-delta modulated signal.

A second aspect of the present invention contemplates a mute function which can be realized by a digital signal processing system which processes the sigma-delta modulated signal by using the following means. Initially, problems will be described with reference to the one-bit sigma-delta modulated signal.

In the case of the one-bit sigma-delta modulated signal, a sigma-delta modulated signal of an audio signal with a frequency band ranging from a negative maximum value to a positive maximum value as shown in FIG. 8A is converted to a binary pulse number modulated signal of "+1" and "−1" as schematically shown in FIG. 8A. At this time, a point corresponding to a mid-point (i.e., 0 V) is converted to a pulse number modulated signal in which a pulse number of "+1" and a pulse number of "−1" are the same as shown in FIGS. 8C and 8D.

This is expressed by the following equation:

$$\sum_{n=0}^{m} Xn = \sum_{n=0}^{m=a+b} (+1)xa + (-1)xb = 0 \rightarrow a = b$$

Therefore, when the one-bit sigma-delta modulated signal is recorded, reproduced and transmitted in actual practice, as shown in FIG. 8B, "+1" is converted to "1" and "−1" is converted to "0".

It is customary that, if a signal is lost when an abnormality occurs during the recording and reproducing process or the transmission line is disconnected, then the signal is fixed to "1" or "0". In that case, consecutive "1" and "0" in the sigma-delta modulated signal are equivalent to the positive maximum value and the negative maximum value, respectively.

Figure 9A:
FIG. 9A is a schematic diagram used to explain a sigma-delta modulated signal.
Figure 9B:
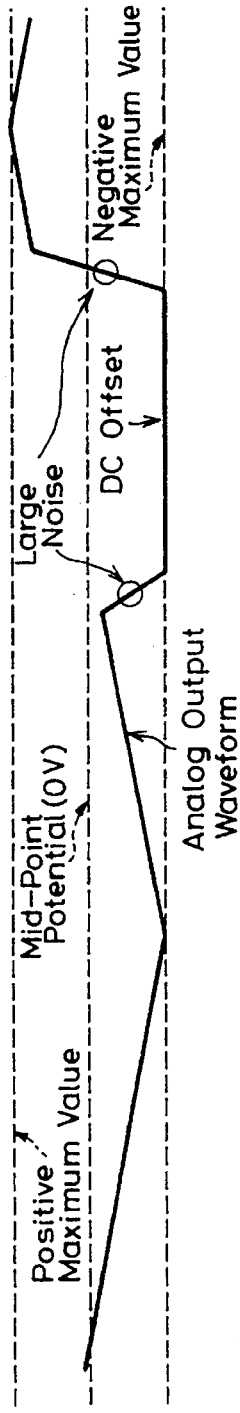
FIG. 9B is a schematic diagram used to explain a sigma-delta modulated signal.
Figure 9C:
FIG. 9C is a schematic diagram used to explain a sigma-delta modulated signal.
Figure 9D:
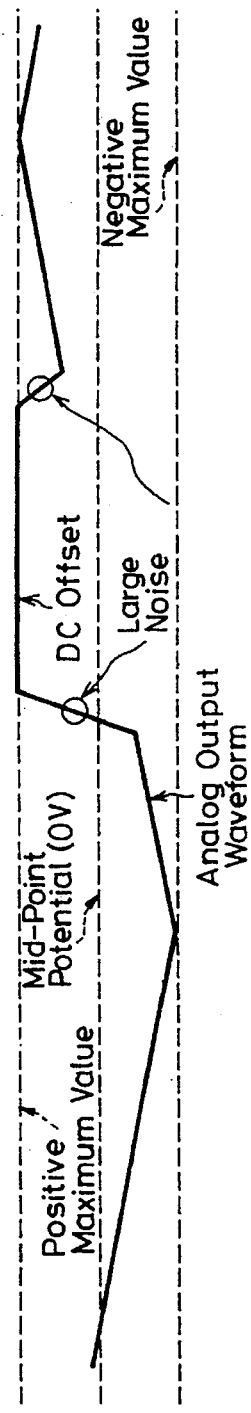
FIG. 9D is a schematic diagram used to explain a sigma-delta modulated signal.

Therefore, the moment an abnormality occurs or the transmission line is disconnected during the recording and reproducing process, there occur maximum output noises and excessive DC offsets as shown in FIG. 9A (digital signal), FIG. 9B (analog signal), FIG. 9C (digital signal) and FIG. 9D (analog signal). There is then the risk that an offensive noise will be generated and that the monitor amplifier and speaker will be damaged by such an extreme output signal.

Digital acoustic equipment for PCM (pulse code modulated) data generally handle digital data in the form of 2's complement digital data. Therefore, even if the signal is fixed to all "1" or all "0" after the signal is lost when an abnormality occurs or the transmission line is disconnected during the reproduction process, all "1" or all "0" corresponds to the mid-point, i.e., the mute signal. As a result, the possibility that a monitor amplifier and/or speaker will be damaged is greatly lessened.

This means that, if the signal is lost when the abnormality occurs or the transmission line is disconnected during the recording and reproducing process, then it is possible to realize the mute function. Therefore, with respect to the sigma-delta modulated signal, when the abnormality occurs or the transmission line is disconnected and the signal is lost during the recording and reproducing process, if a signal corresponding to the mid-point is input, then it is possible to realize the mute function.

Figure 10:
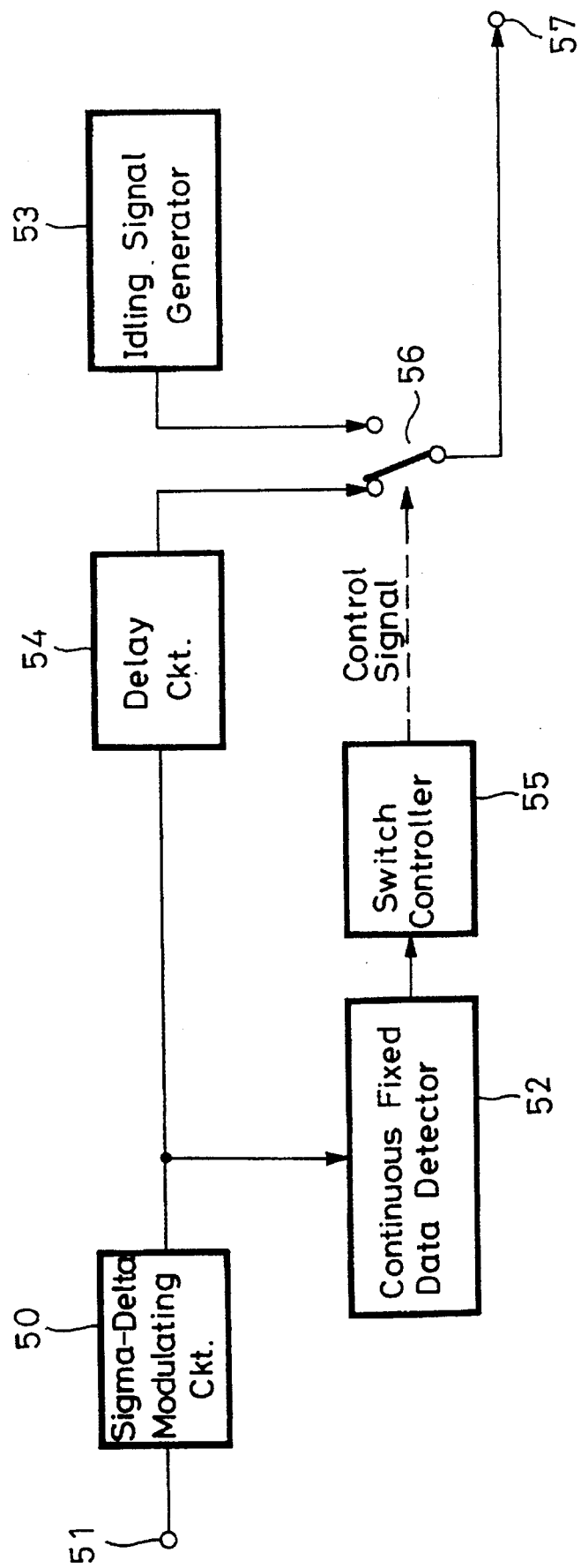
FIG. 10 is a schematic block diagram showing a main portion of a digital audio transmission apparatus according to a fourth embodiment of the present invention.

As shown in FIG. 10, this fundamental arrangement is composed of an input terminal 51 to which an input audio signal is supplied, a sigma-delta modulating circuit 50 for sigma-delta modulating the input audio signal supplied thereto from the input terminal 51, a continuous fixed data detector 52 for detecting continuous fixed data of duration longer than a certain predetermined time period by monitoring the signal which results from sigma-delta modulating the input audio signal by the sigma-delta modulating circuit 50, A circuit that realizes the mute function includes the continuous fixed value data detector 52 for detecting a continuous fixed data which continues for more than a certain predetermined time duration by monitoring an input signal supplied to an input terminal 51. An idling signal generator 53 for generating a sigma-delta modulated signal which is held at the mid-point potential (generally 0 V, for example) when demodulated to an analog signal, a delay circuit 54, a switch circuit 55, a switch controller 56 and an output terminal 57.

Operation of this circuit will be described below in which case a one-bit sigma-delta modulated signal is processed. The continuous fixed value data detector 52 connected to the output of the sigma-delta modulating circuit 52 detects whether or not a modulated input signal (FIG. 11A) has fixed value data continued more than a certain time which does not exist in the sigma-delta modulated audio signal. When the fixed value data is detected, it is necessary to monitor the signal for a predetermined time. Therefore, in order to prevent the fixed value signal from being output during this detection, the sigma-delta modulated signal is input to the delay circuit 54 which delays the signal by a delay time required when the fixed value data is detected and the switch 56 is switched.

If the continuous fixed value data detector 52 detects that the continuous fixed value data continues more than the predetermined time, the switch controller 55 generates a control signal (FIG. 11B) which controls the switch 54 such that the switch 54 switches the signal (FIG. 11C) of the delay circuit 54 to a signal (FIG. 11D) from the idling signal generator 53. Then, the switch 56 switches the output to the idling signal and this circuit is placed in the mute state. The signal thus switched (FIG. 11E) is developed at the output terminal 57.

When the fixed value data in which the input signal is continued has recovered to a normal sigma-delta modulated signal, the continuous fixed value data detector 52 detects the change of data. In this case, the modulated signal is input to the delay circuit 54 which delays a signal by a predetermined delay time required when the fixed value data is detected and the switch 56 is switched. In order to prevent an excessive output to terminal 57 when recovery is achieved, switch controller 55 provides a releasing control signal (FIG. 11B) at a predetermined delay time, sufficient to allow recovery of a normal sigma delta modulated signal, to cause switch 56 to switch the output of delay circuit 54 to output terminal 57.

Accordingly, in this apparatus, an output shown in FIG. 11E is developed at the output terminal 57. Then, this signal is changed to a signal shown in FIG. 11F when demodulated to the analog signal and it is possible to prevent the excessively large noise and the DC offset from being generated. Specifically, according to this signal, a noise of small level is generated but this noise is not so offensive and cannot destroy the monitor amplifier and speaker.

As described above, it is possible to realize the mute function used when the continuous fixed value data continue more than a certain time, which does not exist in the sigma-delta modulated audio signal, is entered into the input signal.

While the sigma-delta modulated signal is drawn as the waveform of a regular modulation pattern in order to schematically express the sigma-delta modulated signal in FIGS. 8, 9 and 11, a practical sigma-delta modulated signal has a little irregularity. Therefore, when the input signal is switched to the idling signal or the idling signal is switched to the input signal, it is possible to detect a portion in which the signal pattern of the input signal and the signal pattern of the idling signal are in agreement with each other during a short period.

Figure 12:
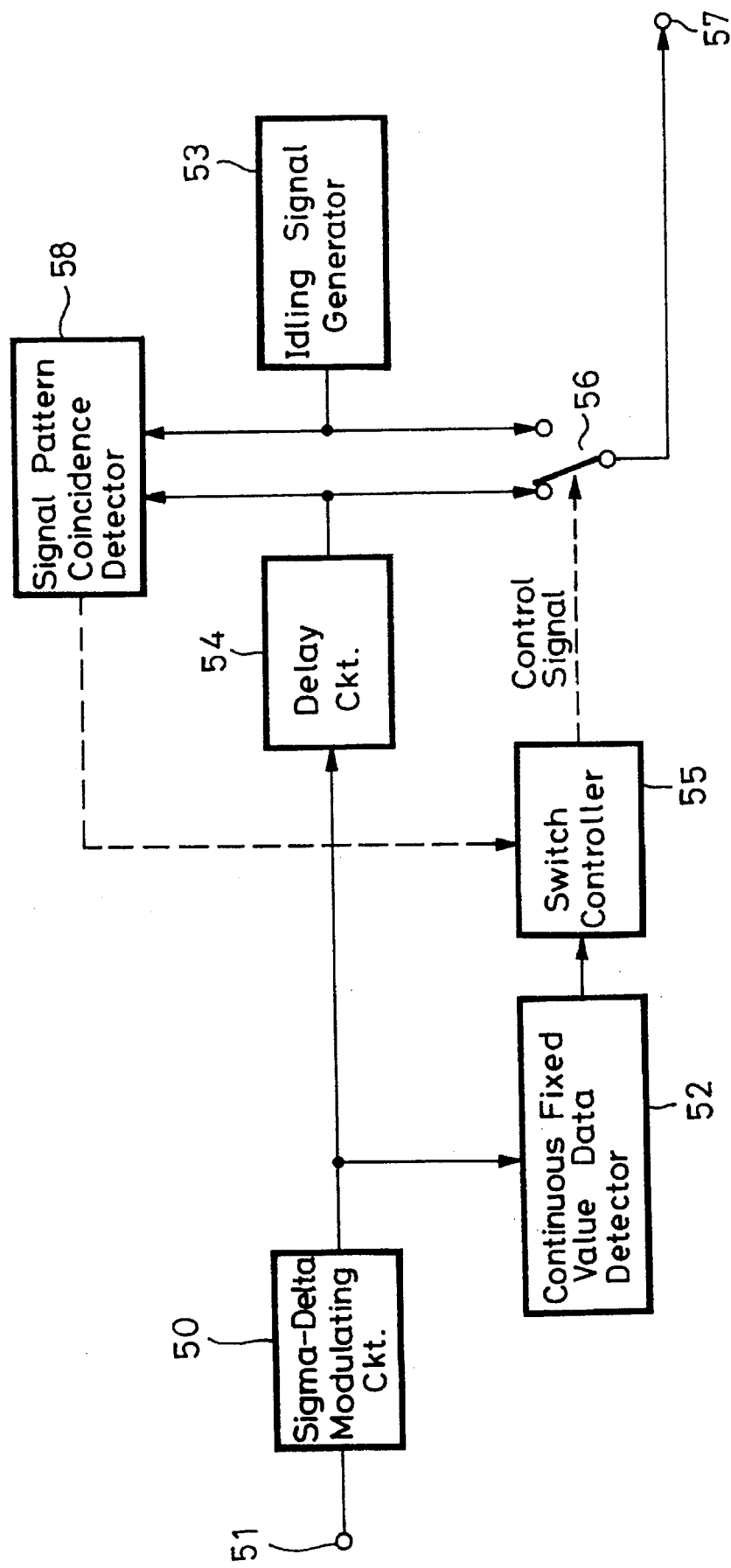
FIG. 12 is a schematic block diagram showing a main portion of a digital audio transmission apparatus according to a fifth embodiment of the present invention.

Accordingly, if the coincidence between the signal pattern of the input signal and the signal pattern of the idling signal is detected and the signal is switched, then it is possible to suppress a transient (shock) noise generated when the mute is released. FIG. 12 shows in block form an arrangement in which a signal pattern coincidence detector 58 is provided additionally, and FIGS. 13A through 13F show signals of respective portions corresponding to a series of signal flow. In FIGS. 12 and FIGS. 13A through 13F correspond to FIG. 10 and FIGS. 11A through 11F and parts and elements identical to those of FIG. 10 and FIGS. 11A through 11F are marked with the same references.

As shown in FIG. 12, the continuous fixed value data detector 52 connected to the output of the sigma-delta modulating circuit 50 detects whether or not an input signal (FIG. 13A) has the continuous fixed value data continued more than a certain time which does not exist in the sigma-delta modulated signal. When the fixed value data is detected, it is necessary to monitor the signal during a predetermined time. In order to prevent the fixed value signal from being output during this detection, the input signal is input to the delay circuit 54 which delays the input signal by the delay time required when the fixed value data is detected and the switch is switched.

If the continuous fixed value data detector 52 detects that the continuous fixed value data continues more than a predetermined time, then the switch controller 55 generates a control signal (FIG. 13B) which switches the switch 54 so that the signal (FIG. 13C) from the delay circuit 54 is switched to the signal (FIG. 13D) from the idling signal generator 53. Then, the output is switched to the idling signal side and the circuit is placed in the mute state. The signal thus switched FIG. 11E) is developed at the output terminal 57.

When the input signal has recovered from the continuous fixed value data to the normal sigma-delta modulated signal, the continuous fixed value data detector 52 detects the change of data. Since the modulated signal is input to the delay circuit 54 which delays the signal by the delay time required when the continuous fixed data is detected and the switch is changed-over, if the switch 56 is switched immediately after the change of data is detected, then the continuous fixed value data remaining in the delay circuit 54 is output and an excessively large noise and a DC offset are generated.

Therefore, the mute release control signal (FIG. 11B) output from the switch controller 55 is delayed by the delay circuit 54 by the delay time required after the change of data is detected and then output. Concurrently therewith, the signal (FIG. 13C) from the delay circuit 54 and the signal (FIG. 13D) from the idling signal generator 53 are supplied to the signal pattern coincidence detector 58. If it is determined that these signal patterns are in agreement with each other, then the output is switched to the input signal side and then the mute is released.

Thus, the signal is returned to the normal sigma-delta modulated signal and the mute is released at the portion in which the coincidence between the signal patterns is detected. Therefore, it is possible to realize the mute function used when the continuous fixed value data continues more than the predetermined time, which does not exist in the sigma-delta modulated signal, is entered into the input signal. Also, if the coincidence between the signal pattern of the input signal and the signal pattern of the idling signal is detected and the signal is switched, then it is possible to suppress the shock noise generated when the mute function is released.

Figure 14A:
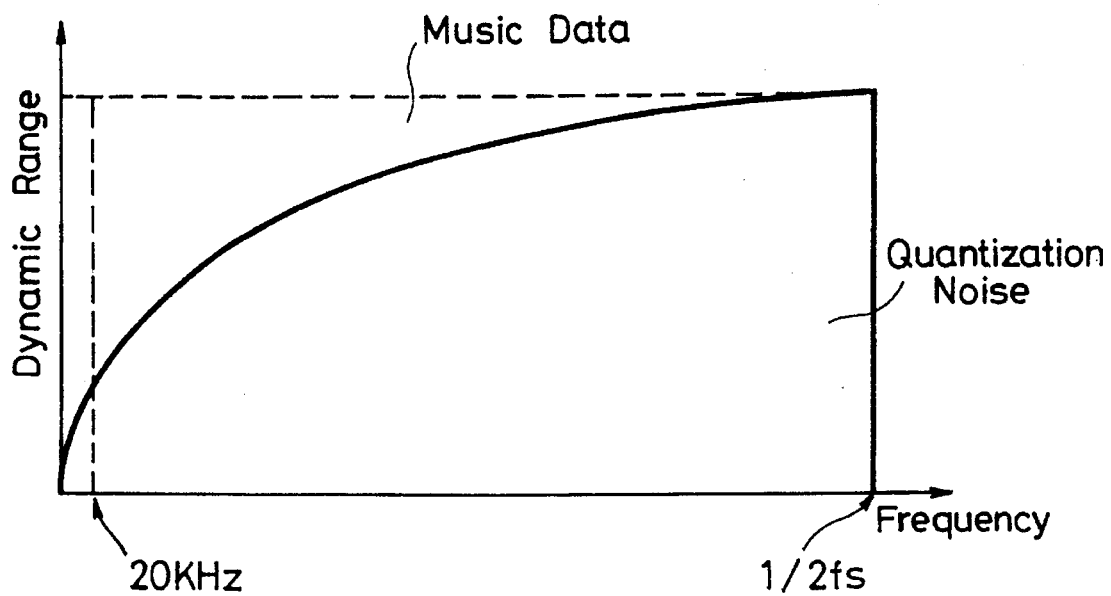
FIG. 14A is a schematic diagram used to explain operation of the digital audio transmission apparatus according to the present invention.
Figure 14B:
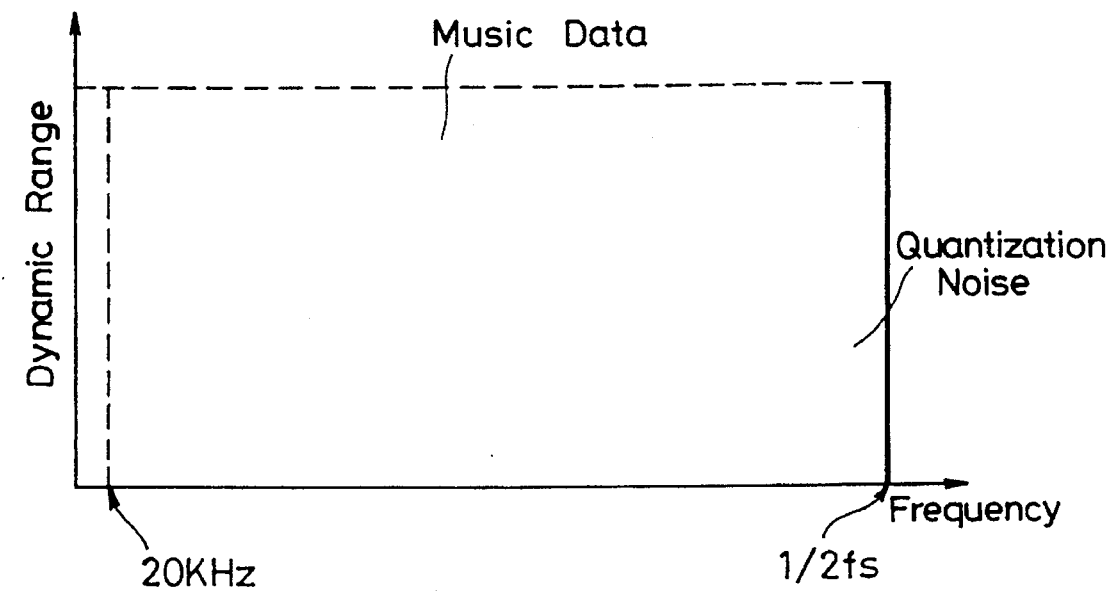
FIG. 14B is a schematic diagram used to explain operation of the digital audio transmission apparatus according to the present invention.

Further, the idling signal generator 53 may generate a signal corresponding to a mid-point according to a sigma-delta modulation similar to the input signal. In this case, a signal of an audio band is lost and a noise of substantially high frequency band peculiar to the sigma-delta modulation shown in FIG. 14A is left. If a signal of a period of one half of the sampling frequency fs of the sigma-delta modulation is used as the idling signal, a signal spectrum is formed of only a component of ½ of the sampling frequency fs as shown in FIG. 14B. Therefore, it is possible to suppress the noise.

Figure 15:
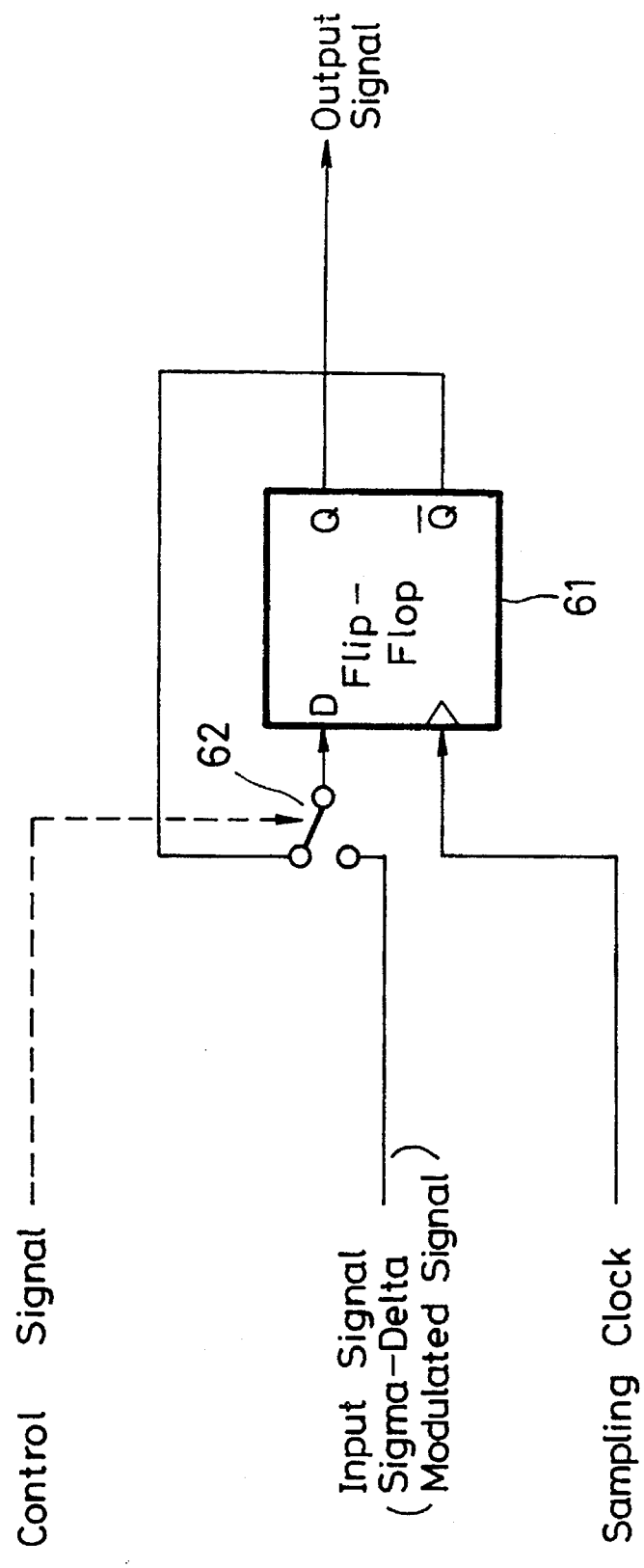
FIG. 15 is a block diagram showing a main portion of a digital audio transmission apparatus according to a sixth embodiment of the present invention.

In the case of the one-bit sigma-delta modulation, as shown in FIG. 15, it is possible to realize the mute function by a D-type flip-flop 61 and a switch 62. Thus, the circuit arrangement can be simplified.

As shown in FIG. 15, a sigma-delta modulated input signal is supplied through the switch 62 to the D terminal of the D-type flip-flop 61. The D-type flip-flop 61 is supplied at its clock terminal with a sampling clock signal. The D-type flip-flop 61 derives a positive output signal the an inverted output signal of the D-type flip-flop 61 is supplied to the switch 62. Then, the switch 62 is changed over in response to the control signal.

Therefore, in this apparatus, when the switch 62 is changed over in response to the control signal, the inverted output signal is supplied to the D terminal of the D-type flip-flop 61. Thus, the D-type flip-flop 61 derives a signal which is inverted in response to the sampling clock signal. As described above, it is possible to realize the mute function in which the signal of the period of ½ of the sampling frequency fs of the sigma-delta modulation by the D-type flip-flop 61 and the switch 62.

As described above, according to the above-mentioned apparatus, it is possible to prevent the noise of the maximum level from being generated when an abnormality occurs in the transmission system by switching the quantized signal to the predetermined idling signal.

While the one-bit sigma-delta modulation is described above by way of example, the present invention is not limited thereto and it is apparent that the mute function can be realized with the similar arrangement with respect to multi-bit sigma-delta modulation.

Further, the mute function circuit according to the present invention can be used as an external digital mute function circuit in an A/D converter LSI and a D/A converter LSI having a sigma-delta modulation front end which is now produced.

According to the present invention, it becomes possible to easily expand the quantized bit number by effecting the transmission by using the so-called sigma-delta modulation. Furthermore, it is possible to prevent the noise of maximum level from being generated when the abnormality occurs in the transmission system by switching the quantized signal to the predetermined idling signal.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

It will be recognized that the present invention is not limited to a digital audio recorder, but may be embodied as an independent processing device which may be connected between an input source, such as a microphone, and the input of a digital recording device, such as for example, a digital audio tape recorder. As noted there are many variations of the present invention which can be effected by one skilled in the art without departing from the scope of the claims herein.

What is claimed is:

1. An audio signal processing apparatus comprising:

sigma-delta modulating means for outputting a sigma-delta modulated audio signal performing sigma-delta modulation on an input audio signal;

a detecting circuit for detecting that said sigma-delta modulated audio signal maintains a fixed value for a time period longer than a predetermined time present in the sigma-delta modulation;

idling signal generating means for generating an idling signal corresponding to a mid-point potential of said input audio signal;

a delay circuit for delaying said sigma-delta modulated audio signal output from said sigma-delta modulating means by a predetermined time period; and switching means receiving a delayed output signal of said delay circuit and said idling signal and being controlled by said detecting circuit for switching and outputting the delayed signal from said delay circuit or said idling signal based on a detected result of said detecting circuit, wherein said switching means outputs said idling signal when said detecting circuit detects that said sigma-delta modulated audio signal has a fixed value for a time period longer than a predetermined time found in said sigma-delta modulation.

2. An audio signal supplying apparatus according to claim 1, further comprising a pattern detecting circuit for detecting whether a pattern of said delayed sigma-delta modulated signal from said delay circuit and a pattern of said idling signal are in agreement and wherein said switching means switches its output from said idling signal to said delayed signal and outputs said delayed sigma-delta modulated signal when said pattern detecting circuit detects that the pattern of said delayed signal and the pattern of said idling signal are in agreement.

3. An audio recording device comprising:

an input terminal for receiving an input audio signal;

recording circuitry for recording audio data onto a recording medium;

a sigma-delta modulator for modulating said input audio signal by performing sigma-delta modulation and outputting a sigma-delta modulated audio signal;

a detecting circuit for detecting when said sigma-delta modulated audio signal maintains a fixed value for a time period greater than a predetermined period of time present in the sigma-delta modulation;

an idling signal generator for generating an idling signal having an amplitude substantially equal to a mid-point potential of said input audio signal;

a delay circuit for delaying said sigma-delta modulated audio signal output from said sigma-delta modulating means for a fixed time and outputting a delayed sigma-delta modulated audio signal;

a switch receiving a delayed sigma-delta modulated signal from said delay circuit and said idling signal for selectively connecting one of said delayed sigma-delta modulated audio signal and said idling signal to said recording circuitry; and a controller for controlling said switch to input said idling signal to said recording circuitry where said detecting circuit detects that said sigma-delta modulated audio signal has maintained a fixed value for greater than said predetermined period of time.

* * * * *

UNITED STATES PATENT AND TRADEMARK OFFICE
CERTIFICATE OF CORRECTION

PATENT NO. : 5,574,453
DATED : November 12, 1996
INVENTOR(S) : Ayataka Nishio & Yasuhiro Ogura It is certified that error appears in the above-indentified patent and that said Letters Patent is hereby corrected as shown below:

Col.1, line 16, change "type" to --tape--
          line 17, after "broadcasting" insert --,--
    Col.6, line 24, change "delay" to --delayed--
          same line, change "delayed" to --delay--
          line 50, after "of" insert --the--

Signed and Sealed this

Twenty-fifth Day of November, 1997

Attest:

BRUCE LEHMAN

*Attesting Officer*      *Commissioner of Patents and Trademarks*